United States Patent
Peng

(10) Patent No.: US 9,330,445 B2
(45) Date of Patent: May 3, 2016

(54) LOCAL CONTRAST ENHANCEMENT METHOD AND APPARATUS

(71) Applicant: Himax Imaging Limited, Tainan (TW)

(72) Inventor: Yuan-Chih Peng, Tainan (TW)

(73) Assignee: HIMAX IMAGING LIMITED, Tainan (TW)

( * ) Notice: Subject to any disclaimer, the term of this patent is extended or adjusted under 35 U.S.C. 154(b) by 71 days.

(21) Appl. No.: 14/264,291

(22) Filed: Apr. 29, 2014

(65) Prior Publication Data

US 2015/0310595 A1    Oct. 29, 2015

(51) Int. Cl.
- G06K 9/00 (2006.01)
- G06T 5/40 (2006.01)
- G06K 9/46 (2006.01)

(52) U.S. Cl.
CPC .............. *G06T 5/40* (2013.01); *G06K 9/4642* (2013.01)

(58) Field of Classification Search
None
See application file for complete search history.

(56) References Cited

U.S. PATENT DOCUMENTS

| | | | | |
|---|---|---|---|---|
| 8,953,688 B2 * | 2/2015 | Sartor | ................... | H04N 5/145 375/240.16 |
| 2001/0024531 A1 * | 9/2001 | Edgar | ................... | G06T 5/002 382/254 |
| 2004/0071352 A1 * | 4/2004 | Mizoguchi | ......... | G06K 9/00234 382/233 |
| 2005/0141747 A1 * | 6/2005 | Shi | ......................... | G06T 1/0028 382/100 |
| 2006/0078182 A1 * | 4/2006 | Zwirn | ................... | G06T 7/0012 382/128 |
| 2007/0092137 A1 * | 4/2007 | Zhao | ........................ | G06T 3/40 382/169 |
| 2008/0144931 A1 * | 6/2008 | Yan | ......................... | G06T 5/009 382/168 |
| 2008/0310752 A1 * | 12/2008 | Han | ......................... | G06T 5/20 382/274 |
| 2012/0155764 A1 * | 6/2012 | Ogura | ................... | G06T 7/2053 382/171 |

* cited by examiner

*Primary Examiner* — Hadi Akhavannik
(74) *Attorney, Agent, or Firm* — McClure, Qualey & Rodack, LLP

(57) ABSTRACT

A local enhancement method is provided, including: dividing an image into a plurality of blocks, which include a first block and a second block adjacent to the first block; generating histograms of the blocks respectively; generating enhancement functions of the blocks respectively based on the corresponding histograms, wherein the enhancement functions include at least a first contrast enhancement function of the first block and a second contrast enhancement function of the second block; and for each pixel in the blocks: generating a first enhanced pixel value for a current pixel of the first block based on the first contrast enhancement; generating a second enhanced pixel value for the current pixel of the first block based on the second contrast function of the second block; and generating a final enhanced pixel value for the current pixel based on the first and second enhanced pixel values.

13 Claims, 5 Drawing Sheets

LOCAL CONTRAST ENHANCEMENT METHOD AND APPARATUS

BACKGROUND OF THE INVENTION

1. Field of the Invention

The present invention relates to image processing technology, and in particular relates to local contrast enhancement technology.

2. Description of the Related Art

Various image enhancement approaches are used to improve image quality. One of the image enhancement approaches is contrast enhancement. Contrast enhancement is a procedure used to improve contrast in images. Compared with global contrast enhancement, local contrast enhancement can bring out more detail in an image. For local contrast enhancement, an image is first divided into several blocks, and then a procedure called histogram equalization is performed to each of the blocks so that the brightness values of pixels in a block are transformed based on a transformation function (contrast enhancement function) of the block. The image after histogram equalization looks inconsistent due to different average brightness from block to block.

BRIEF SUMMARY OF THE INVENTION

The present invention provides a local contrast enhancement method, in which an image is divided into a plurality of blocks, which include first and second blocks; generating histograms of the blocks respectively. Enhancement functions of the blocks are generated respectively based on the corresponding histograms, wherein the enhancement functions include at least a first contrast enhancement function of the first block and a second contrast enhancement function of the second block which is adjacent to the first block. For each pixel in the blocks, a first enhanced pixel value for a current pixel of the first block is generated based on the first contrast enhancement; a second enhanced pixel value for the current pixel of the first block is generated based on the second contrast function of the second block; and a final enhanced pixel value for the current pixel is generated based on the first and second enhanced pixel values.

The present invention also provides a local enhancement apparatus, comprising: a block divider for dividing an image into a plurality of blocks, which include at least a first block, a second block horizontally adjacent to the first block, a third block vertically adjacent to the first block, and a fourth block horizontally adjacent to the third block; a block histogram generator for generating histograms of the blocks respectively; a block enhancement function generator for generating enhancement functions of the blocks respectively based on the corresponding histograms, wherein the enhancement functions include at least a first enhancement function of the first block, a second enhancement function of the second block, a third enhancement function of the third block, and a fourth enhancement function of the fourth block; a vertical interpolator for processing each pixel in the blocks by generating an first vertically interpolated pixel value for a current pixel of the first block based on the first enhancement function and the third enhancement function, and generating a second vertically interpolated pixel value for the current pixel of the first block based on the second enhancement function and the fourth enhancement function; and a horizontal interpolator for generating an enhanced pixel value for the current pixel based on horizontally interpolating the first vertically interpolated pixel value and the second vertically interpolated pixel value.

The present invention also provides another local enhancement apparatus, comprising an enhancement module for dividing an image into a plurality of blocks, and generating histograms on each of the blocks to generate corresponding enhancement functions, wherein the blocks at least include at least a first block and a second block adjacent to the first block, and the enhancement functions include at least a first enhancement function of the first block and a second enhancement function of the second block; an interpolation module for generating an interpolated enhancement function for a current pixel of the first block, by interpolating coefficients of the first enhancement function and the second enhancement function; and a mapping unit for generating an enhanced pixel value by applying the current pixel to the interpolated enhancement function.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention provides a local contrast enhancement method to overcome the deficiencies in the prior art. A preferred embodiment will be discussed in accordance with FIGS. 1 and 2.

Figure 1:
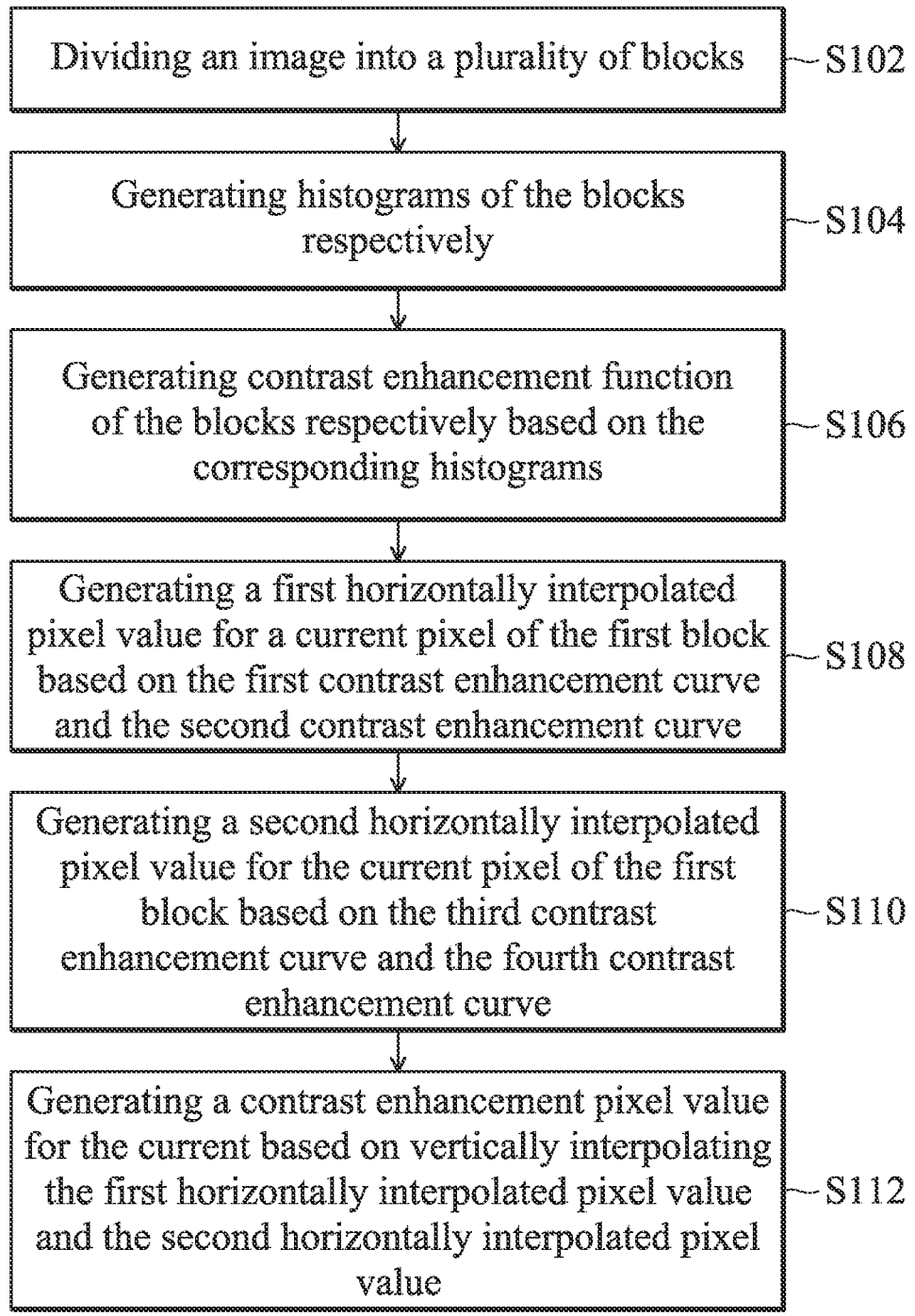
FIG. 1 is a flow chart of the local contrast enhancement method according to the preferred embodiment of the present invention.
Figure 2:
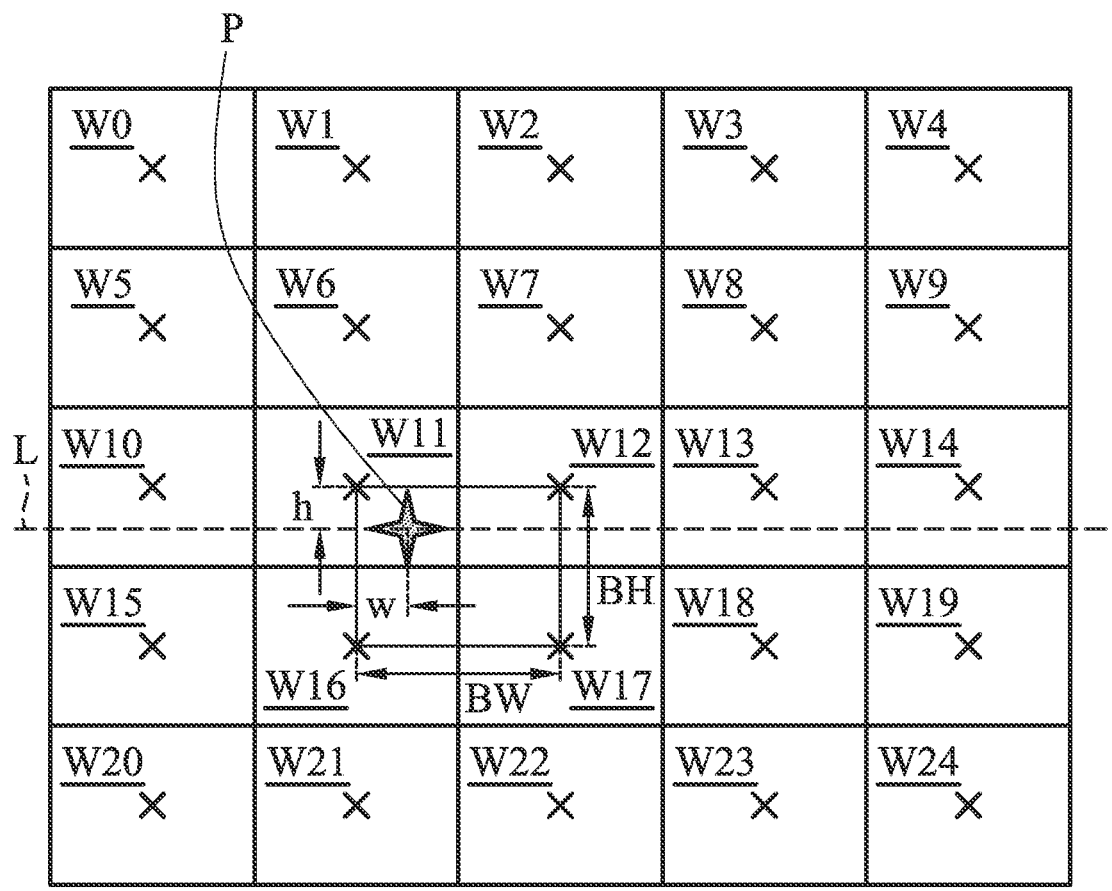
FIG. 2 is the image on which the local contrast enhancement of the present invention is performed.

FIG. 1 is a flow chart of the local contrast enhancement method according to the preferred embodiment of the present invention, and FIG. 2 is the image on which the local contrast enhancement of the present invention is performed.

Figure 3:
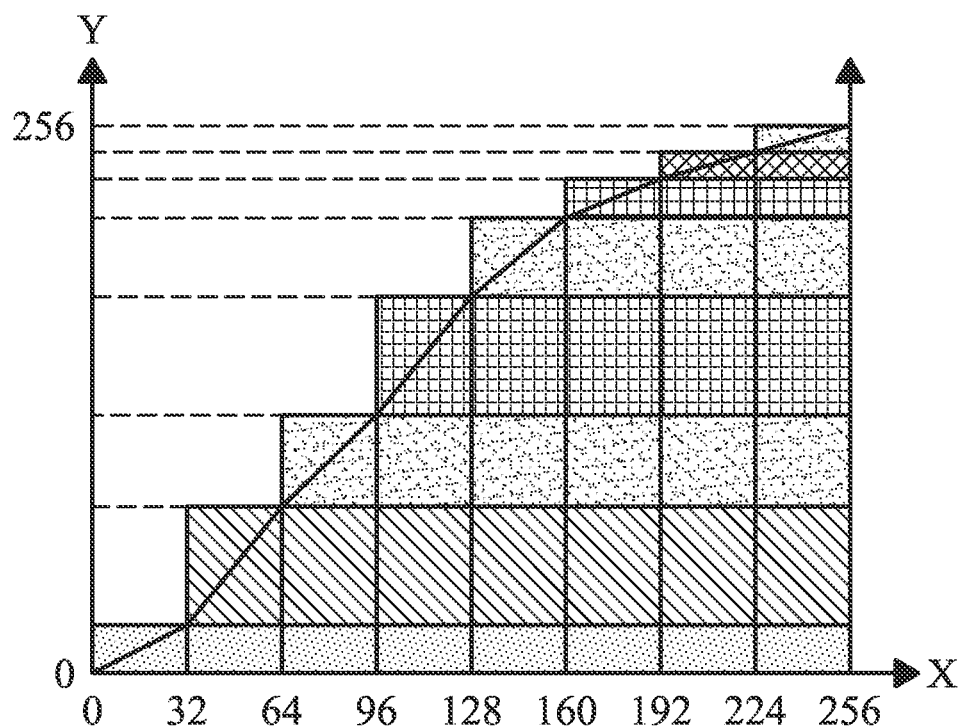
FIG. 3 shows an exemplary curve of a contrast enhancement function for one of the blocks.

At first in step S102, the image is divided into a plurality of blocks. As shown in FIG. 2, the image 200 is divided into 25 squares W0~W24, wherein each has a height BH and a width WH. Then in step S104, histograms of the blocks are generated respectively. In step S106, contrast enhancement functions he0~he24 are generated respectively for the blocks W0~W24 based on the corresponding histograms. For illustration, FIG. 3 shows an exemplary curve of a contrast enhancement function for one of the blocks, where each of the original brightness value in an X-axis is mapped to a new brightness value in a Y-axis. In one embodiment, the contrast enhancement functions he0~he24 are polynomial functions, this step S106 is to obtain coefficients of each term of the polynomial functions he0~he24.

However, due to different contrast enhancement functions, the edges between two of the blocks may have different brightness and make the whole image 200 inconsistent. Therefore, the embodiment of the present invention uses a specific procedure in the following the steps to deal with this problem. Different from the interpolation in the prior art which is performed pixel by pixel, the embodiment of the present invention performs the horizontal interpolation and the vertical interpolation for each pixel. Take a current pixel P, marked as a star sign of the block W11 in FIG. 2, as an example. In step 108, a first horizontally interpolated pixel value P1 for the current pixel P of the block W11 is generated based on the contrast enhancement functions of the blocks W11 and W12. In step 110, a second horizontally interpolated pixel value P2 for the current pixel P of the block W11 is generated based on the contrast enhancement functions of the blocks W16 and W17. There are various ways to do the interpolation in steps S108 and S110. In this embodiment, a bi-linear interpolation is illustrated as an example, but not limited to. The weightings of the bi-linear interpolation are determined based on distances between the current pixel P and the corresponding adjacent blocks. The first horizontally interpolated pixel P1 is generated by the following equation:

$$P1 = \frac{(BW - w)}{BW} he11 + \frac{w}{BW} he12$$

The second horizontally interpolated pixel P2 is generated by the following equation:

$$P2 = \frac{(BW - w)}{BW} he16 + \frac{w}{BW} he17$$

Finally in step S112, a contrast enhanced pixel value P' is generated for the current pixel P based on vertically interpolating the first horizontally interpolated pixel value P1 and the second horizontally interpolated pixel value P2. The weightings of the bi-linear interpolation in step S112 are determined based on distances between the current pixel P and the corresponding adjacent blocks. The contrast enhanced pixel value P' is thus generated based on the following equation:

$$P' = \frac{(BH - h)}{BH} P1 + \frac{w}{BW} P2.$$

The steps S108-S112 are repeated for each pixel in the image, so as to obtain a contrast enhanced image.

It is noted that this embodiment performs horizontal interpolations (S108, S110) and then vertical interpolation (S112), but the sequence may be altered. In another embodiment, vertical interpolations maybe performed first. That is, a first vertically interpolated pixel value P1' for the current pixel P of the block W11 is generated based on the contrast enhancement functions of the blocks W11 and W16. Then a second vertically interpolated pixel value P2' for the current pixel P of the block W11 is generated based on the contrast enhancement functions of the blocks W12 and W17. Finally, a contrast enhanced pixel value P' is generated for the current pixel P based on horizontally interpolating the first vertically interpolated pixel value P1' and the second vertically interpolated pixel value P2'.

From the steps described above, it can be found that each of the pixels on the scan line L has the same vertical distance h to the neighborhood squares W10~W14 so that the steps S108 and S110 can be easily and quickly completed, thus making the present procedure more efficient than that of the prior art.

Figure 4:
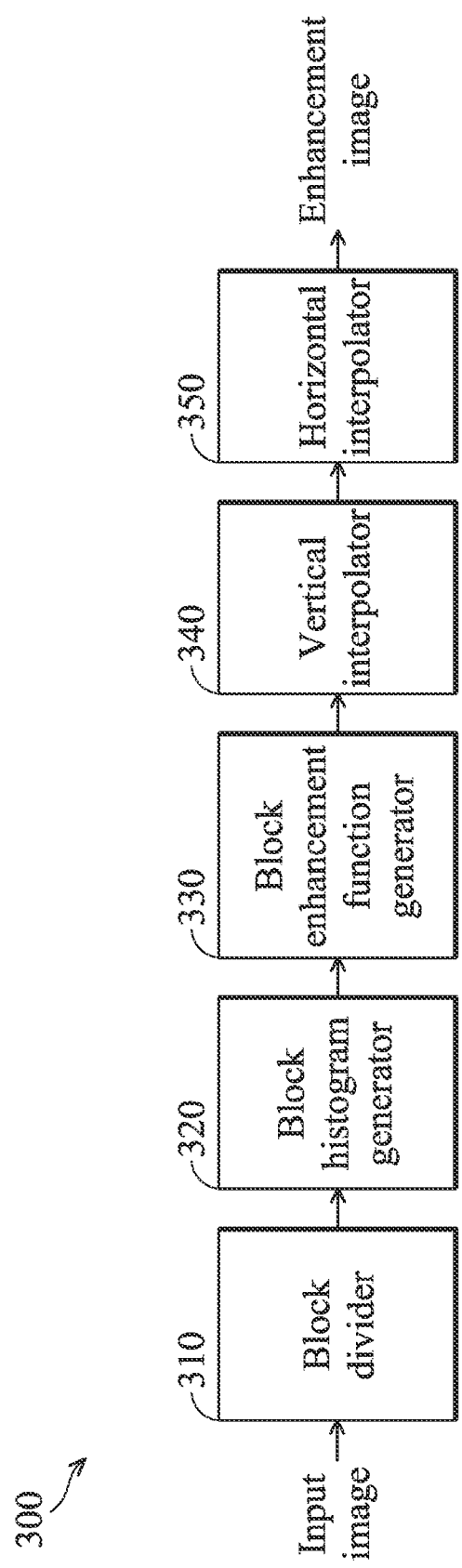
FIG. 4 is a block diagram of a local enhancement apparatus according to a second embodiment of the present invention.

FIG. 4 is a block diagram of a local enhancement apparatus according to the second embodiment of the present invention. The local enhancement apparatus 300 includes a block divider 310, a block histogram generator 320, a block enhancement function generator 330, a vertical interpolator 340 and a horizontal interpolator 350. At first, the block divider 310 divides the input image into a plurality of blocks. As shown in FIG. 2, the image 200 is divided into 25 squares W0~W24, wherein each has a height BH and a width WH. Then the block histogram generator 320 generates histograms of the blocks respectively. Next, the block enhancement function generator 330 generates enhancement functions he0-he24 respectively for the blocks W0~W24 based on the corresponding histograms. In this embodiment, the enhancement function is a contrast enhancement function, but other enhancement functions such as sharpness or color calibration are also possible. For illustration, FIG. 3 shows an exemplary curve of a contrast enhancement function for one of the blocks, where each of the original brightness value in an X-axis is mapped to a new brightness value in a Y-axis. In one embodiment, the contrast enhancement functions he0~he24 are polynomial functions, the step S106 is to obtain coefficients of each term of the polynomial functions he0~he24.

However, due to different contrast enhancement functions of different blocks, the edges between two of the blocks may have different brightness and make the whole image 200 inconsistent. The embodiment of the present invention performs the horizontal interpolation and the vertical interpolation for each pixel to achieve image consistency. Take a current pixel P, marked as a star sign of the block W11 in FIG. 2, as an example. The vertical interpolator 340 first generates a first vertically interpolated pixel value Pv1 for the current pixel P of the block W11 based on the contrast enhancement functions of the blocks W11 and W16. Then the vertical interpolator 340 generates a second vertically interpolated pixel value Pv2 for the current pixel P of the block W11 based on the contrast enhancement functions of the blocks W12 and W17. There are various ways to do the interpolation in the vertical interpolator 340. In this embodiment, a bi-linear interpolation is illustrated as an example, but not limited to. The weightings of the bi-linear interpolation are determined based on distances between the current pixel P and the corresponding adjacent blocks. The first vertically interpolated pixel Pv1 is generated by the following equation:

$$Pv1 = \frac{h}{BH} he16(P) + \frac{(BH - h)}{BH} he11(P)$$

The second horizontally interpolated pixel Pv2 is generated by the following equation:

$$Pv2 = \frac{h}{BH} he17(P) + \frac{(BH - h)}{BH} he12(P)$$

Finally the horizontal interpolator 350 generates a contrast enhanced pixel value P''' is generated for the current pixel P based on horizontally interpolating the first vertically interpolated pixel value Pv1 and the second vertically interpolated pixel value Pv2. The weightings of the bi-linear interpolation used by the horizontal interpolator 350 are determined based on distances between the current pixel P and the corresponding adjacent blocks. The contrast enhanced pixel value P‴ is thus generated based on the following equation:

$$P''' = \frac{(BH-h)}{BH}Pv1 + \frac{w}{BW}Pv2.$$

The vertical interpolator 340 and the horizontal interpolator 350 process each pixel in the image, so as to obtain a contrast enhanced image. It is noted that, in this embodiment, the vertical interpolator 340 is placed before the horizontal interpolator 350, but the sequence may be altered. In another embodiment, the horizontal interpolator 350 may be placed before the vertical interpolator 340.

Figure 5:
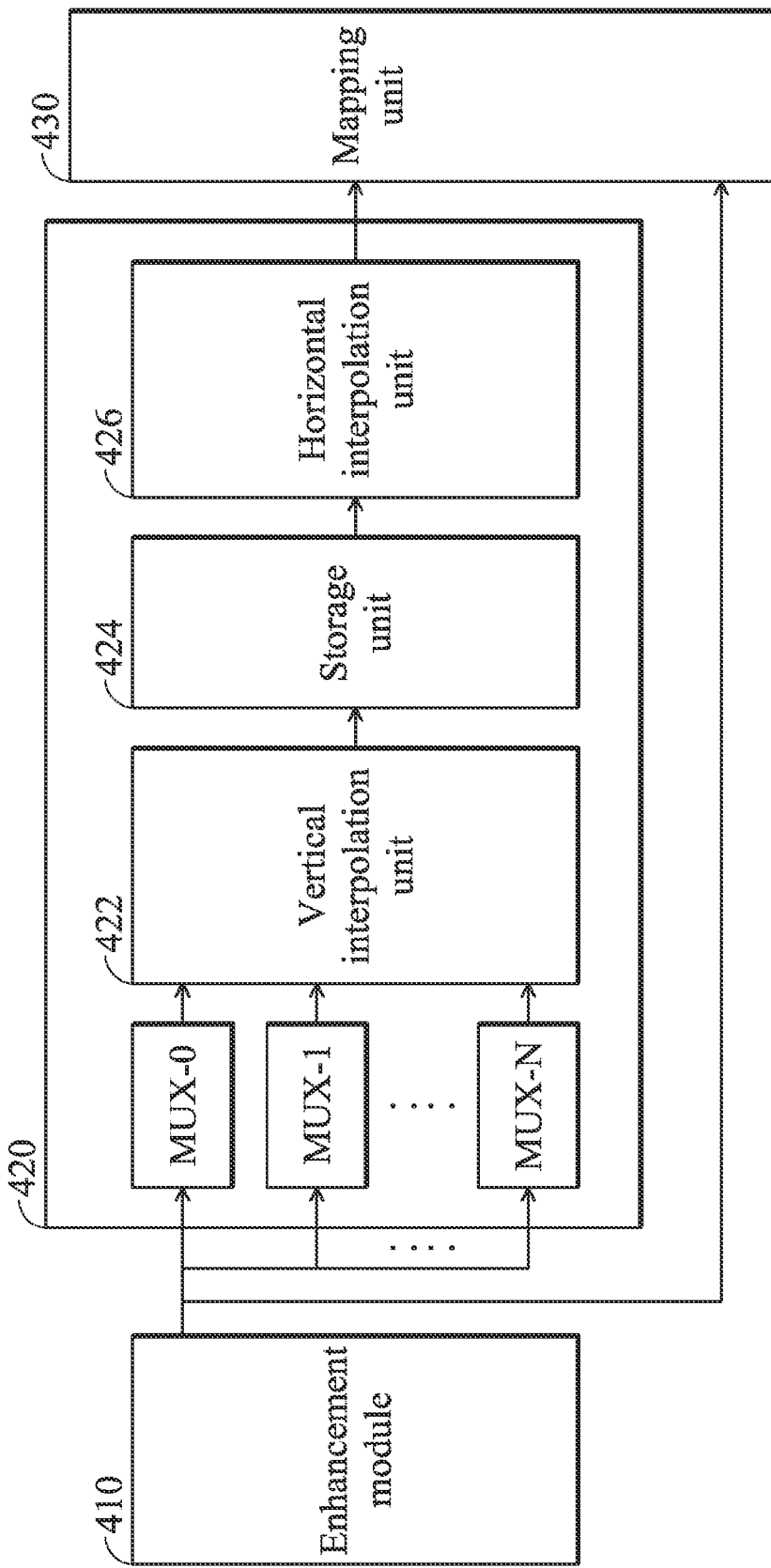
FIG. 5 is a schematic diagram of the local enhancement apparatus of a third embodiment of the present invention.

FIG. 5 is a schematic diagram of the local enhancement apparatus of a third embodiment of the present invention. The above method 100 and the local enhancement apparatus 300 apply the current pixel to different enhancement functions of different blocks and then do the interpolation. The local enhancement apparatus 400 interpolates the enhancement functions and then applies the current pixel to the interpolated enhancement function to generate an enhanced pixel value. The local enhancement apparatus 400 comprises an enhancement module 410 and an interpolation module 420. The enhancement module 410 divides an image (for example, image 200 in FIG. 2) into a plurality of blocks (for example, squares W0~W24 in FIG. 2), generates histograms on each of the blocks, and generates corresponding enhancement functions (for example, contrast enhancement function he0~he24 in the embodiment of FIG. 2). The interpolation module 420 is coupled to the enhancement module 410, and is used for obtaining all of the interpolated enhancement functions of the blocks. Given that the enhancement functions can be expressed by N-order polynomial functions, the interpolation module interpolates the coefficients of corresponding enhancement functions of corresponding blocks for each pixel. For example, the current pixel P in image 200 in FIG. 2 has four corresponding enhancement functions he11, he12, he16 and he17. The interpolation module 420 generates an interpolated enhancement function ihe11 for the block W11 based on the corresponding enhancement functions he11, he12, he16 and he17. The weightings of the interpolation by the interpolation module 420 may be related to the distances between the current pixel P and the corresponding blocks W11, W12, W16 and W17. Then the mapping unit 430 applies the pixels of block W11 to the interpolated enhancement function ihe11 to generate enhanced pixel values.

For an image sensor with rolling shutter, the image is captured line by line. The following example illustrates the detail of the interpolation module 420 for this type of the image sensor. The interpolation module 420 includes multiplexers MUX-0 to MUX-N, a vertical interpolation unit 422, a storage unit 4224 and a horizontal interpolation unit 426. For illustration, enhancement functions of 1-order polynomial function are taken as example:

$$he01(P) = A_0P + B_0 \text{ for block } W_0$$
$$he02(P) = A_1P + B_1 \text{ for block } W_1$$
$$\vdots$$
$$he24(P) = A_{24}P + B_{24} \text{ for block } W_{24}$$

For the pixels in the block W11, The multiplexer MUX-0 receives the first set of coefficients A0-A24 and outputs corresponding coefficients A11, A12, A16 and A17. The multiplexer MUX-2 receives the second set of coefficients B0-B24 and outputs corresponding coefficients B11, B12, B16 and B17. The vertical interpolation unit 422 performs vertical interpolation in the column direction (i.e., y direction) on the enhancement functions of the blocks for each pixel on a line (for example, the scan line L in FIG. 2). Take the current pixel P in FIG. 2 as an example, the vertical interpolation unit 422 generates a coefficient Ai based on the first set of coefficients A16 and A11 according to the weightings based on the distances between the current pixel P and the corresponding blocks W11 and W16. The vertical interpolation unit 422 generates a coefficient Bi based on the second set of coefficients B16 and B11 according to the weightings based on the distances between the current pixel P and the corresponding blocks W11 and W16. The vertical interpolation unit 422 generates a coefficient Aj based on the first set of coefficients A16 and A11 according to the weightings based on the distances between the current pixel P and the corresponding blocks W11 and W16. The vertical interpolation unit 422 generates a coefficient Bj based on the second set of coefficients B16 and B11 according to the weightings based on the distances between the current pixel P and the corresponding blocks W11 and W16. The calculated coefficients Ai, Bi, Aj, Bj can be applied to the pixels on the line L.

$$Ai = \left(\frac{h}{BH}A_{16} + \frac{BH-h}{BH}A_{11}\right)$$

$$Bi = \left(\frac{h}{BH}B_{16} + \frac{BH-h}{BH}B_{11}\right)$$

$$Aj = \left(\frac{h}{BH}A_{17} + \frac{BH-h}{BH}A_{12}\right)$$

$$Bj = \left(\frac{h}{BH}B_{17} + \frac{BH-h}{BH}B_{12}\right)$$

The storage unit 424 is coupled to the vertical interpolation unit 422, and is used for storing the coefficients from the vertical interpolation unit 422. The horizontal linear interpolation unit 426 is coupled to the storage unit 424, and is used for performing horizontal interpolation in the line direction (i.e., x direction) on the stored coefficients of the vertical interpolation unit 422 for each pixel (for example, pixel P in FIG. 2) of the line L to obtain an interpolated enhancement function $Y_{out}$ of the pixel.

$$Y_{out} = \left(\frac{w}{BW}Ai + \frac{(BW-w)}{BW}Aj\right)P + \left(\frac{w}{BW}Bi + \frac{(BW-w)}{BW}Bj\right)$$

The enhancement apparatus 400 further comprises a mapping unit 430 applying a pixel to the interpolated enhancement function $Y_{out}$ to generate an enhanced pixel value for the pixel.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A local enhancement method, comprising the steps of:
dividing an image into a plurality of blocks, which include at least a first block a second block and a third block;
generating histograms of the blocks respectively;
generating enhancement functions of the blocks respectively based on the corresponding histograms, wherein the enhancement functions include at least a first contrast enhancement function of the first block a second contrast enhancement function of the second block, and a third enhancement function of the third block; and
for each pixel in the blocks:
generating a first enhanced pixel value for a current pixel of the first block based on the first contrast enhancement;
generating a second enhanced pixel value for the current pixel of the first block based on the second contrast function of the second block, wherein the second block is horizontally adjacent to the first block;
generating a third enhanced pixel value for the current pixel based on the third enhancement function, wherein the third block is vertically adjacent to the first block; and
generating a final enhanced pixel value for the current pixel based on the interpolation of the first enhanced pixel value the second enhanced pixel value, and the third enhanced pixel value.

2. The method according to claim 1, wherein the interpolating step is a bi-linear interpolation.

3. The method according to claim 1, wherein the interpolating step is a bi-cubic linear interpolation.

4. The method according to claim 1, wherein a weighting of the interpolation is based on a distance between the current pixel, the first block the second block, and the third block.

5. A local enhancement apparatus, comprising:
a block divider for dividing an image into a plurality of blocks, which include at least a first block, a second block horizontally adjacent to the first block, a third block vertically adjacent to the first block, and a fourth block horizontally adjacent to the third block;
a block histogram generator for generating histograms of the blocks respectively;
a block enhancement function generator for generating enhancement functions of the blocks respectively based on the corresponding histograms, wherein the enhancement functions include at least a first enhancement function of the first block, a second enhancement function of the second block, a third enhancement function of the third block, and a fourth enhancement function of the fourth block;
a vertical interpolator for processing each pixel in the blocks by generating an first vertically interpolated pixel value for a current pixel of the first block based on the first enhancement function and the third enhancement function, and generating a second vertically interpolated pixel value for the current pixel of the first block based on the second enhancement function and the fourth enhancement function; and
a horizontal interpolator for generating an enhanced pixel value for the current pixel based on horizontally interpolating the first vertically interpolated pixel value and the second vertically interpolated pixel value.

6. The apparatus according to claim 5, wherein the first vertically interpolated pixel value and the second vertically interpolated pixel value are generated by bi-linear interpolation.

7. The apparatus according to claim 6, wherein the first vertically interpolated pixel value generating step uses weightings based on distances between the current pixel, the first block and the third block.

8. The apparatus according to claim 6, wherein the second vertically interpolated pixel value generating step uses weightings based on distances between the current pixel, the second block and the fourth block.

9. The apparatus according to claim 5, wherein the first vertically interpolated pixel value and the second vertically interpolated pixel value are generated by bi-cubic interpolation.

10. The apparatus according to claim 5, wherein the enhancement functions are contrast enhancement functions.

11. The apparatus according to claim 5, wherein the enhancement functions are sharpness enhancement functions.

12. A local enhancement apparatus comprising:
an enhancement module for dividing an image into a plurality of blocks, and generating histograms on each of the blocks to generate corresponding enhancement functions, wherein the blocks at least include at least a first block a second block, a third block and a fourth block, the second block is horizontally adjacent to the first block, the third block is vertically adjacent to the first block and the fourth block is horizontally adjacent to the third block, and the enhancement functions include at least a first enhancement function of the first block a second enhancement function of the second block, a third enhancement function of the third block and a fourth enhancement function of the fourth block;
an interpolation module for generating an interpolated enhancement function for a current pixel of the first block, by interpolating coefficients of the first enhancement function the second enhancement function, the third enhancement function and the fourth enhancement function, the interpolation module including:
a vertical interpolation unit for generating a first vertical interpolated function by interpolating the coefficients of the first enhancement function and the third enhancement function, and for generating a second vertical interpolated function by interpolating the coefficients of the second enhancement function and the fourth enhancement function;
a horizontal interpolation unit for generating the interpolated enhancement function by interpolating the coefficients of the first vertical interpolated function and the second vertical interpolated function; and
a mapping unit for generating an enhanced pixel value by applying the pixel to the interpolated enhancement function.

13. The apparatus according to claim 12, wherein weightings of the interpolations are based on a distance between the current pixel, the first block, the second block, the third block and the fourth block.

* * * * *